(12) United States Patent
Howson

(10) Patent No.: US 11,798,219 B2
(45) Date of Patent: *Oct. 24, 2023

(54) TOPOLOGY PRESERVATION IN A GRAPHICS PIPELINE BY ANALYZING A GEOMETRY SHADER

(71) Applicant: Imagination Technologies Limited, Kings Langley (GB)

(72) Inventor: John W. Howson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,949

(22) Filed: Sep. 6, 2022

(65) Prior Publication Data

US 2023/0005208 A1  Jan. 5, 2023

Related U.S. Application Data

(63) Continuation of application No. 16/250,706, filed on Jan. 17, 2019, now Pat. No. 11,468,620.

(30) Foreign Application Priority Data

Jan. 18, 2018 (GB) ...................... 1800794

(51) Int. Cl.
| | |
|---|---|
| *G06T 15/00* | (2011.01) |
| *G06T 1/20* | (2006.01) |
| *G06T 17/20* | (2006.01) |
| *G06T 1/60* | (2006.01) |
| *G06F 9/54* | (2006.01) |

(52) U.S. Cl.
CPC ............ *G06T 15/005* (2013.01); *G06F 9/54* (2013.01); *G06T 1/20* (2013.01); *G06T 1/60* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 2002/0050995 A1* | 5/2002 | Crotty | G06F 30/367 345/440 |
| 2004/0189651 A1 | 9/2004 | Zatz et al. | |
| 2005/0243094 A1 | 11/2005 | Patel et al. | |
| 2007/0182746 A1 | 8/2007 | Jiao et al. | |
| 2008/0001952 A1 | 1/2008 | Srinivasan et al. | |
| 2008/0266296 A1* | 10/2008 | Ramey | G06T 15/005 345/440 |
| 2009/0122602 A1 | 5/2009 | Kilpatrick | |
| 2011/0084976 A1 | 4/2011 | Duluk, Jr. et al. | |
| 2013/0106889 A1 | 5/2013 | Lee et al. | |

(Continued)

*Primary Examiner* — Anh-Tuan V Nguyen
(74) *Attorney, Agent, or Firm* — Potomac Law Group, PLLC; Vincent M DeLuca

(57) ABSTRACT

A graphics processing engine has a geometry shading stage having two modes of operation. In the first mode of operation, each primitive output by the geometry shading stage is independent, whereas in the second mode of operation, connectivity between input primitives is maintained by the geometry shading stage. The mode of operation of the geometry shading stage can be determined based on the value of control state data which may be generated at compile-time for a geometry shader based on analysis of that geometry shader.

19 Claims, 8 Drawing Sheets

(56) References Cited

U.S. PATENT DOCUMENTS

| | | |
|---|---|---|
| 2013/0265309 A1 | 10/2013 | Goel et al. |
| 2014/0125669 A1 | 5/2014 | Kilgariff et al. |
| 2014/0210819 A1 | 7/2014 | Mei et al. |
| 2014/0267259 A1* | 9/2014 | Frascati ............... G06T 15/005 345/423 |
| 2014/0267260 A1* | 9/2014 | Hakura ............... G06T 15/005 345/626 |
| 2014/0267276 A1 | 9/2014 | Hakura et al. |
| 2015/0317818 A1 | 11/2015 | Howson et al. |
| 2015/0348317 A1 | 12/2015 | Hakura et al. |
| 2016/0055667 A1 | 2/2016 | Goel et al. |
| 2016/0070549 A1 | 3/2016 | Hall |
| 2017/0039754 A1 | 2/2017 | Oneppo et al. |
| 2017/0084078 A1 | 3/2017 | Boudier |
| 2018/0114290 A1 | 4/2018 | Paltashev et al. |

* cited by examiner

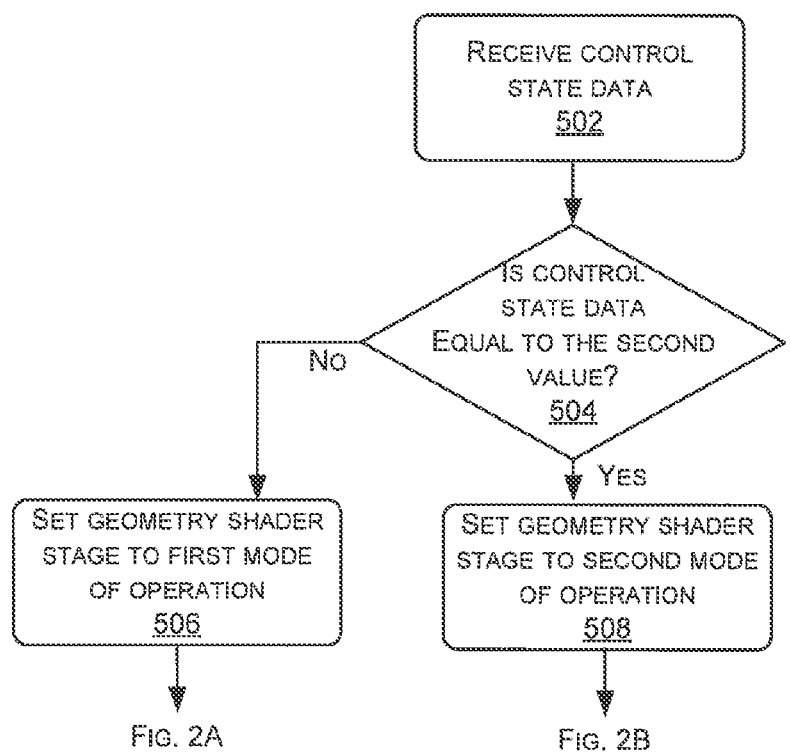

TOPOLOGY PRESERVATION IN A GRAPHICS PIPELINE BY ANALYZING A GEOMETRY SHADER

CROSS-REFERENCE TO RELATED APPLICATIONS AND CLAIM OF PRIORITY

This application is a continuation under 35 U.S.C. 120 of copending application Ser. No. 16/250,706 filed Jan. 17, 2019, which claims foreign priority under 35 U.S.C. 119 from United Kingdom Application No. 1800794.8 filed Jan. 18, 2018.

BACKGROUND

Graphics processing systems are used to process graphics data. For example, an application running on a computing system may need to render an image of a three dimensional (3D) scene for display to a user. The application can send graphics data to a graphics processing system to be rendered, wherein the graphics data describes primitives to be rendered. As is known in the art, primitives are usually convex polygons, such as triangles or convex quadrilaterals, wherein a primitive typically has its position in the rendering space of the graphics processing system defined by the position of its vertices, and may have its appearance defined by other attributes such as colour or texture attributes. An object in a scene may be represented by one or more primitives. As graphics processing systems progress, their capability to render complex images improves, and as such applications make use of this and provide more complex images for graphics processing systems to render. This means that the number of primitives in images tends to increase, so the ability of a graphics processing system to process the primitives efficiently becomes more important.

One known way of improving the efficiency of a graphics processing system is to render an image in a tile-based manner. In this way, the rendering space into which primitives are to be rendered is divided into a plurality of tiles, which can then be rendered independently from each other. In order to render primitives, a rendering unit uses memory to store intermediate results (e.g. depth values and primitive identifiers, etc.) for different sample positions. If the rendering unit operates on a tile at a time then most (or all) of this memory can be situated "on-chip", i.e. on the Graphics Processing Unit (GPU), which might not be possible if the whole rendering space is rendered at once. Therefore, in a tile-based graphics system, the number of read and write operations between the GPU and an off-chip memory (i.e. which may be referred to as "system memory") is typically reduced compared to a non-tile-based graphics system. Since read and write operations between the GPU and the system memory are typically very slow and use lots of power (compared to operations performed within the GPU), tile-based graphics systems are often more efficient (in terms of power and speed) than non-tile-based graphics systems.

The embodiments described below are provided by way of example only and are not limiting of implementations which solve any or all of the disadvantages of known graphics processing systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A graphics processing engine that comprises a geometry shading stage having two modes of operation is described. In the first mode of operation, each primitive output by the geometry shading stage is independent, whereas in the second mode of operation, connectivity between input primitives is maintained by the geometry shading stage. The mode of operation of the geometry shading stage can be determined based on the value of control state data which may be generated at compile-time for a geometry shader based on analysis of that geometry shader.

A first aspect provides a method of controlling operation of a geometry shading stage in a graphics processing system, the method comprising: receiving a geometry shader for execution by the geometry shading stage; analyzing the geometry shader to determine whether it preserves connectivity; in response to determining that the geometry shader does not preserve connectivity of primitives, generating control state data having a first value; in response to determining that the geometry shader does preserve connectivity of primitives, generating control state data having a second value; and outputting the control state data.

A second aspect provides a processor configured to control operation of a geometry shading stage in a graphics processing system, the processor being configured to: receive a geometry shader for execution by the geometry shading stage; analyze the geometry shader to determine whether it preserves connectivity; in response to determining that the geometry shader does not preserve connectivity of primitives, generate control state data having a first value; in response to determining that the geometry shader does preserve connectivity of primitives, generate control state data having a second value; and output the control state data.

A third aspect provides a method of controlling operation of a geometry shading stage in a graphics processing system, the method comprising: receiving, in a compiler, a geometry shader for execution by the geometry shading stage; analyzing the geometry shader to determine whether it preserves connectivity; in response to determining that the geometry shader does not preserve connectivity of primitives, outputting geometry shader code; in response to determining that the geometry shader does preserve connectivity of primitives, including geometry shader code in a prior stage of a graphics pipeline implemented within the graphics processing system.

A fourth aspect provides a computing device arranged to control operation of a geometry shading stage in a graphics processing system, the computing device comprising: a processor; and memory storing computer executable instructions that when executed cause the computing device to: receive a geometry shader for execution by the geometry shading stage; analyze the geometry shader to determine whether it preserves connectivity; in response to determining that the geometry shader does not preserve connectivity of primitives, output geometry shader code; in response to determining that the geometry shader does preserve connectivity of primitives, include geometry shader code in a prior stage of a graphics pipeline implemented within the graphics processing system.

A fifth aspect provides a processor in a graphics processing system comprising: a geometry shading stage having a first and a second mode of operation, wherein in the first mode of operation each output primitive is independent and in the second mode of operation connectivity of primitives is maintained.

A sixth aspect provides a method of operation of a geometry shading stage in a graphics processing system, the method comprising: receiving control state data; and switching between a first mode of operation and a second mode of operation dependent upon a value of the received control state data, wherein in the first mode of operation each output primitive is independent and in the second mode of operation connectivity of primitives is maintained.

A seventh aspect provides an integrated circuit manufacturing system comprising: a non-transitory computer readable storage medium having stored thereon a computer readable description of an integrated circuit that describes a graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description, wherein the processor comprises: a geometry shading stage having a first and a second mode of operation, wherein in the first mode of operation each output primitive is independent and in the second mode of operation connectivity of primitives is maintained.

The graphics processing system described herein may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing system.

There may be provided an integrated circuit manufacturing system comprising: a non-transitory computer readable storage medium having stored thereon a computer readable integrated circuit description that describes the graphics processing system graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 5 is another flow diagram showing an example of the operation of a geometry shading stage;

Figure 1:
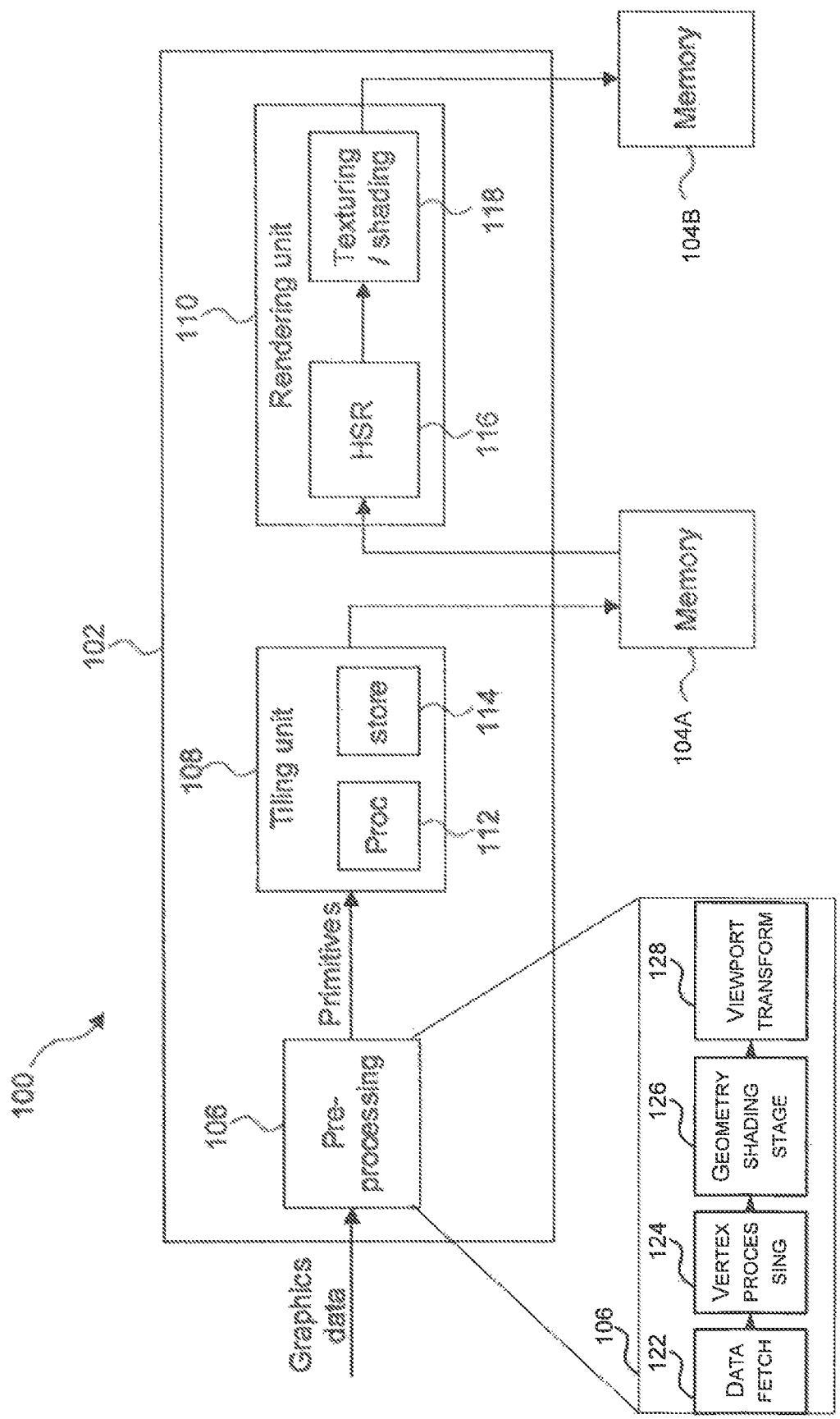
FIG. 1 shows some elements of a tile-based graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

In many examples and as a consequence of how the geometry shading API is defined, the geometry shading stage within a graphics processing system removes connectivity information associated with the incoming geometry data, i.e. whilst the incoming stream of primitives includes connectivity data (e.g. because adjoining primitives will reference two common vertices), the resulting primitive streams emitted by the geometry shading stage are all independent (e.g. because vertices defined in the incoming data are duplicated where required such that there are separate sets of vertices for each of the primitives in the output primitive stream). There are many situations, however, where the geometry shader preserves the topology (e.g. for multi-view rendering, such as stereoscopic rendering or rendering cube maps, where a cube map is a scene that has been rendered in six views, where each view would typically be composed of the visible scene geometry as viewed from the centre of a cube looking outwards towards each face of the cube, or for information gathering operations which analyse vertex data as it passes through) and so the duplication of vertex data in the geometry shading stage unnecessarily increases the amount of vertex data which is written to and subsequently read from memory in a tile-based rendering system, or passed between pipeline stages in an Immediate Mode Rendering (IMR) architecture. In some examples the duplication of vertex data can result in a six-fold increase in the number of vertices written to and read from memory (for tile-based rendering) or passed between pipeline stages (for IMR).

Described herein is a more efficient graphics processing system (or pipeline) in which the geometry shading stage has two different modes of operation. As an example, the selection of a mode of operation from the two modes is made based on control state data that is generated by a compiler when compiling a geometry shader (which is a program that processes primitives) and which is associated with the data (e.g. primitive data) that is processed by the geometry shader. In other words, the control state data travels through the system with the data that is processed by the geometry shader. The control state data may for example be passed as a parallel pipeline state/signal or state that is pipelined with the primitive data. The first mode of operation is used when the compiler detects that the output of the geometry shading stage will modify the connectivity of the output geometry relative to the input geometry. In this mode the geometry shading stage (which is the hardware that executes the geometry shader) processes each primitive from the incoming primitive stream as independent primitives with no connectivity to adjacent primitives and the output primitives are all independent of each other (i.e. each vertex in each primitive is identified uniquely and vertex data is output for each vertex in each primitive). The second mode of operation is used when the compiler detects that the output of the geometry shading stage will not modify the connectivity of the output geometry relative to the input (i.e. connectivity is preserved). In this mode the geometry shading stage takes account of the connectivity between incoming primitives and only processes new vertices for each primitive (i.e. only those vertices which have not been previously processed) and hence the output primitives are not all independent of each other, because adjoining output primitives will refer to common vertices. In this second mode of operation, vertex data for a minimum number of vertices (e.g. there is no duplication of vertices) are written to memory (for tile-based rendering) or passed to the subsequent pipeline stage (for IMR).

Whilst the methods and graphics processing system are described in one example below in terms of stereoscopic rendering which comprises two views—a left view and a right view—the methods can be used wherever a graphics shader preserves topology (vertices themselves may be modified in a consistent manner and the connectivity of the output geometry streams remains the same as the input geometry stream). As well as for multi-view rendering (which may render two or more views of the same instance of the scene, e.g. from different viewpoints), topology may also be preserved in other situations, such as graphics shaders which perform information gathering operations (e.g. which analyse vertex data as it passes through).

FIG. 1 shows some elements of a tile-based graphics processing system 100. The graphics processing system 100 comprises a graphics processing unit (GPU) 102 and two portions of memory 104A and 104B. It is noted that the two portions of memory 104A and 104B may, or may not, be parts of the same physical memory, and both memories 104A and 104B may be situated "off-chip", i.e. not on the same chip as the GPU 102. Communication between the memories (104A and 104B) and the GPU 102 may take place over a communications bus in the system 100.

The GPU 102 comprises a pre-processing module 106, a tiling unit 108 and a rendering unit 110. The tiling unit 108 comprises processing logic 112 and a data store 114, and the rendering unit 110 comprises a hidden surface removal (HSR) module 116 and a texturing/shading module 118. The graphics processing system 100 is arranged such that graphics data describing a sequence of primitives provided by an application is received at the pre-processing module 106. The pre-processing module 106 performs functions such as geometry processing including clipping and culling to remove primitives which do not fall into a visible view. The pre-processing module 106 may also project the primitives into screen-space. The pre-processing module 106 outputs primitives to the tiling unit 108.

The tiling unit 108 receives the primitives from the pre-processing module 106 and determines which of the primitives are present within each of the tiles of the rendering space of the graphics processing system 100. A primitive may be in one or more of the tiles of the rendering space. The tiling unit 108 assigns primitives to tiles of the rendering space by creating display lists for the tiles, wherein the display list for a tile includes indications of primitives (i.e. primitive IDs) which are present in the tile. In addition to generating display lists, the tiling unit 108 also generates data blocks, referred to as primitive blocks, which contain primitive data. The primitive data in a primitive block comprises data for a plurality of vertices and data for a plurality of primitives. As described above, a primitive is defined by the position of its vertices and hence the data for a primitive (in a primitive block) references the vertex data for a plurality of vertices within the same primitive block. The processing logic 112 of the tiling unit 108 performs the operations of the tiling unit 108 and the data store 114 stores data of intermediate results of the tiling process, such as results of tiling calculations and partially filled display lists. The processing logic 112 may be implemented in dedicated hardware designed specifically for performing the operations of the tiling unit 108. Alternatively, at least some of the functionality of the processing logic 112 may be implemented by executing software on a processor wherein the software is written such that when it is executed it causes the processor to perform the operations of the tiling unit 108.

In various examples, once all of the primitives for a render have been tiled then the display lists are complete and they and the primitive blocks are passed to the off-chip memory 104A for storage therein. In other examples, the tiling unit 108 might not use an internal store (such as store 114) to store display lists, and instead primitive identifiers may be written directly to display lists in memory 104A as tiling is performed. Furthermore, in some further examples, the internal store 114 may be implemented in the tiling unit 108, but the internal store 114 might not be big enough to store all of the display lists for all of the tiles at once. Therefore, the internal store 114 may be used to gather tiling results that can then be written out to memory 104A in chunks (or "batches") as the tiling is performed. This can avoid inefficient memory access patterns when primitives are written to different control streams in memory 104A.

The rendering unit 110 fetches the display list for a tile and the primitives relevant to that tile from the memory 104A (i.e. by reading data from a primitive block) and the HSR module 116 performs hidden surface removal to thereby remove fragments of primitives which are hidden in the scene. The remaining fragments are passed to the texturing/shading module 118 which performs texturing and/or shading on the fragments to determine pixel colour values of a rendered image which can be passed to the memory 104B for storage in a frame buffer. The rendering unit 110 processes primitives in each of the tiles and when the whole image has been rendered and stored in the memory 104B, the image can be outputted from the graphics processing system 100 and, for example, displayed on a display.

FIG. 1 also shows an example structure of the pre-processing module 106 in more detail. As shown in FIG. 1, the pre-processing module 106 may comprise a data fetch module 122 which fetches vertex data, a vertex processing module 124, geometry shading stage 126 and a viewport transform module 128 which, in conjunction with a perspective divide, transforms the vertices into screen space coordinates. Although not shown in FIG. 1, the pre-processing module 106 (or more generally the GPU 102) may additionally comprise internal storage (e.g. between the geometry shading stage 126 output and subsequent stages) for buffering vertex data associated with primitives during any processing that occurs after the geometry shading stage 126 (e.g. viewport and perspective transforms, clipping, culling and primitive block assembly).

The geometry shading stage 126 in the pre-processing module 106 operates on a single input primitive (e.g. a point, a line, a triangle, a quad, etc.) at a time. For each input primitive the geometry shading stage 126 can see all the vertex data associated with the primitive. Vertices are identified by index values (or indices). For example, three index values may be used to identify the three vertices of a triangle input primitive. Index values allow the efficient representation of topologies in which vertices are shared. For example, where two triangular primitives share a common vertex, that vertex will be represented by a common index value. From the data relating to an input primitive (e.g. all the vertex data associated with the primitive), the geometry shading stage 126 can generate one or more output primitives of a type that may be different to the input primitive type. For example the geometry shader may be fed with point primitives (i.e. a single vertex), which it might then translates into strips of two triangles to form a quad onto which a point sprite can be mapped.

The geometry shading stage 126 described herein has two modes of operation: the first mode of operation does not preserve topology information and the second mode of operation does preserve topology information. The geometry shading stage 126 switches between the first and second modes of operation based on control state data which is generated at compile time and which travels through the graphics processing system 100 with the graphics data. As described above, the control state data may for example be passed as a parallel pipeline state/signal or state that is pipelined with the primitive data.

The first mode of operation is shown graphically in FIG. 2A and the second mode of operation is shown graphically in FIG. 2B and the difference in operation of the two modes can be described with reference to the arrangement 300 of adjoining primitives shown in FIGS. 3 and 4.

Figure 2A:
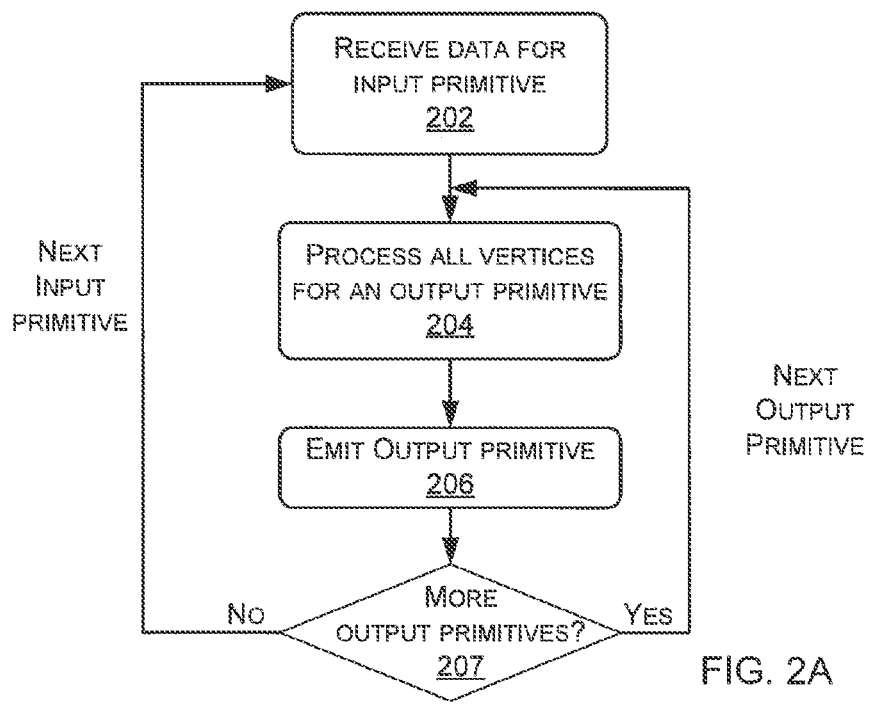
FIG. 2A is a flow diagram of a first mode of operation of a geometry shading stage.

In the first mode of operation as shown in FIG. 2A, data is received for an input primitive (block 202) e.g. vertex data for three vertices for a triangle input primitive. As described above, the geometry shader generates one or more output primitives from an input primitive and as shown in FIG. 2A, all the vertices in an output primitive (e.g. vertex data for three vertices for a triangle output primitive) are processed (block 204). If there are multiple processes, the processing operation (in block 204) is repeated for each process before the output primitive is emitted (block 206), e.g. vertex data for all the vertices in the output primitive is emitted. If the input primitive generates multiple output primitives ('Yes' in block 207) the processing operation (in block 204) is then repeated for each further output primitive until all the output primitives which correspond to the input primitive have been emitted (in block 206). When a primitive is emitted, the data that is emitted is vertex data describing the vertices of the primitive, wherein the emitted data also indicates (e.g. via references or via its format) that the emitted primitive is formed from the appropriate vertices. The method is then repeated for the next input primitive (as indicated by the arrow from 'No' in block 207 to block 202). This first mode of operation may be represented in pseudocode as:

```
FOR (Input Primitives)
    FOR (Output Primitives)
        Process all vertices for output primitive
        Emit (Output Primitive)
```

In the first mode of operation the output primitives generated by the geometry shader (and emitted in block 206) are treated as being unconnected to the input geometry stream as such they do not carry any of the connectivity that the input stream may have possessed. For example, if an incoming strip of triangles, where each triangle shares two vertices with the previous triangle, is processed through the geometry shading stage and each triangle emitted without changes, the resulting geometry stream would lose its connectivity i.e. each triangle would now be composed of 3 unique vertices instead of sharing vertices with prior triangles. If index values are used to identify the vertices of the output primitives then new index values must be generated such that the index values do not indicate the sharing of vertices between primitives.

Figure 2B:
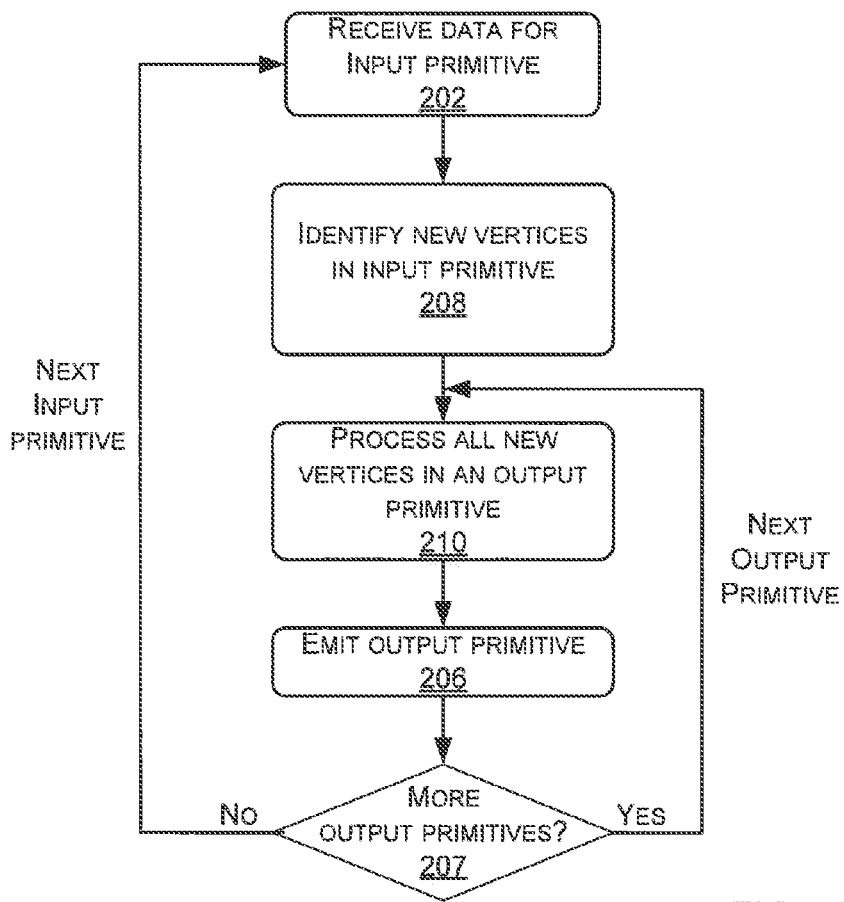
FIG. 2B is a flow diagram of a second mode of operation of a geometry shading stage.

In the second mode of operation as shown in FIG. 2B, data is received for an input primitive (block 202) e.g. vertex data for three vertices for a triangle input primitive, and any new vertices in the input primitive are identified (block 208), where a new vertex is one that has not been previously processed by the geometry shading stage 126 (e.g. in a previous iteration of the method for another input primitive in the primitive stream). Then only those identified new vertices (from block 208) are processed for an output primitive (block 210). If there are multiple processes, the processing operation (in block 210) is repeated for each process (again only processing the new vertices) before the output primitive is emitted (block 206), e.g. vertex data for all the vertices in the output primitive. If the input primitive generates multiple output primitives ('Yes' in block 207) the processing operation (in block 210) is then repeated for each further output primitive until all the output primitives which correspond to the input primitive have been emitted (in block 206). In the second mode, when a primitive is emitted, the data that is emitted is vertex data describing the one or more new vertices of the primitive. The connectivity for the emitted vertices is taken from the original input primitives. That is, the index values used to identify vertex data at the input to the geometry shading stage may also be used to identify the vertices of the output primitives at the output of the geometry shading stage. This is possible because the second mode is used when the shader is known not to modify the topology of the input data. Connectivity, represented by the sharing of vertex data through common index values, is preserved. The method is then repeated for the next input primitive. This mode of operation may be represented in pseudocode as:

```
FOR (Primitive)
    Find new vertices
    FOR (Process)
        Process all new vertices
    Emit (Primitive)
```

Once the new vertices have been processed (in block 210), the vertex data is stored in a buffer (e.g. in the internal storage described above) for subsequent use in the graphics processing system 100 (e.g. for inclusion in a primitive block by the tiling unit 108) in a similar manner to the first mode of operation; however, in the second mode of operation the buffer will only contain the new vertices for each triangle, whereas in the first mode of operation, the buffer will contain three vertices per triangle. In the second mode of operation the vertex data that is stored in the buffer is accessed using the vertex indices and may be referred to as modified vertex data because, although the original vertex indices are used, the geometry shader may modify the vertex data. When operating in the second mode of operation, the vertex data in the buffer may be read more than once by stages of the graphics processing system 100 which follow the geometry shading stage 126 (e.g. because the same vertex index may be used by several primitives, unlike in the first mode of operation where each vertex index is used by only one primitive). In the second mode of operation the index values at the output of the geometry shader are the same as the index values at the input of the geometry shader. The index values may be passed through the geometry shader unmodified, or may be written directly to the buffer, in which case the indices are said to have bypassed the geometry shader.

Figure 3:
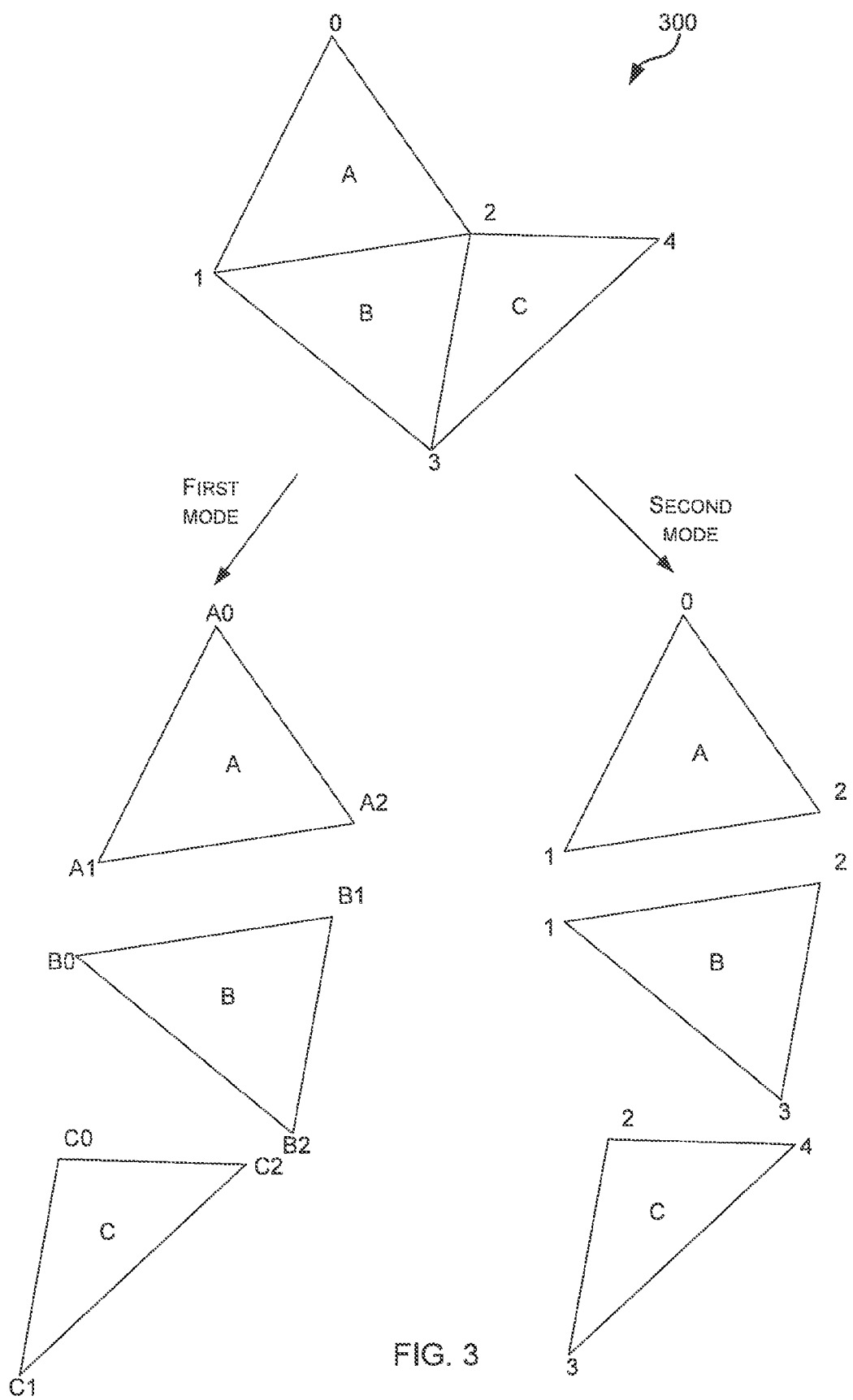
FIG. 3 shows a graphical representation of the two modes of operation shown in FIGS. 2A and 2B.

The difference between the first and second modes of operation can be demonstrated with reference to the arrangement 300 of adjoining primitives A, B, C shown in FIG. 3. In this example, the geometry shader passes through (or bypasses) the topology without changing it. If the first mode of operation is used to process the three adjoining primitives A, B, C shown in FIG. 3, three primitives are output: primitive A comprising vertices A0, A1, A2, primitive B comprising vertices B0, B1, B2 and primitive C comprising vertices C0, C1, C2. Whilst the incoming three primitives referenced only 5 vertices (vertices 0-4), the output primitives, which are all defined independently of each other, reference 9 vertices (vertices A0, A1, A2, B0, B1, B2, C0, C1, C2). In contrast, if the second mode of operation is used to process the same three adjoining primitives A, B, C shown in FIG. 3, three primitives are still output, however, the vertices retain their original indices (although the vertices themselves may have been modified by the geometry shader) and hence the topology information is maintained. The output primitives are primitive A comprising vertices 0, 1, 2, primitive B comprising vertices 1, 2, 3 and primitive C comprising vertices 2, 3, 4. In this mode of operation the incoming three primitives and the output primitives reference the same number of vertices (5 vertices in the example shown). Consequently the amount of vertex data which is stored in memory is significantly less in the second mode of operation than the first mode of operation. Additionally, only 5 vertices are processed in the geometry shader in the second mode of operation, compared to 9 in the first mode of operation.

Figure 4:
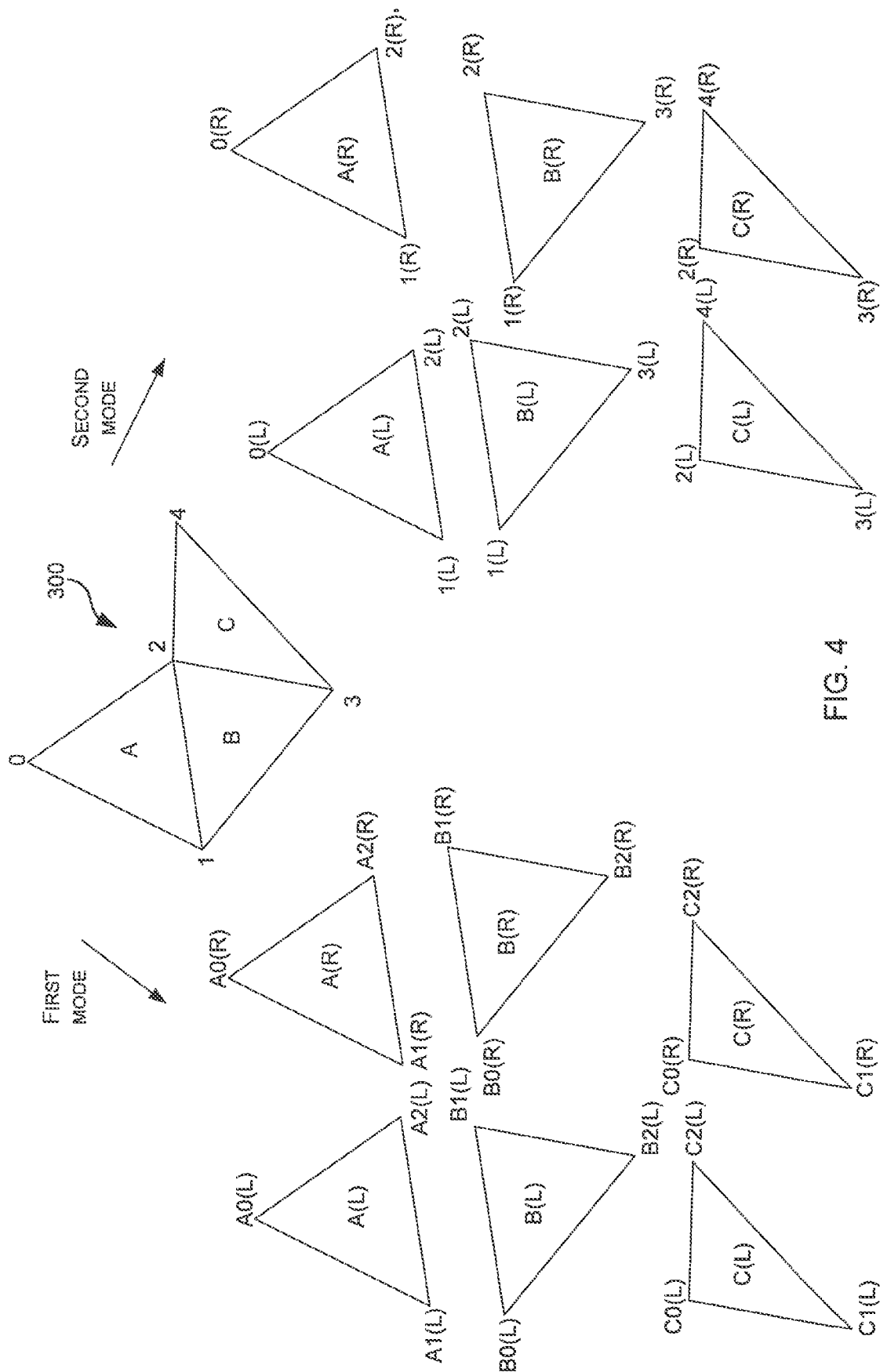
FIG. 4 shows another graphical representation of the two modes of operation shown in FIGS. 2A and 2B.

The difference between the first and second modes of operation can also be demonstrated with reference to the same arrangement 300 of adjoining primitives A, B, C shown in FIG. 4. In this example, the geometry shader duplicates the topology into two parallel streams of primitives, which in this example are labelled L and R. If the first mode of operation is used to process the three adjoining primitives A, B, C shown in FIG. 4, six primitives are output: primitive A(L) comprising vertices A0(L), A1(L), A2(L), primitive A(R) comprising vertices A0(R), A1(R), A2(R), primitive B(L) comprising vertices B0(L), B1(L), B2(L), primitive B(R) comprising vertices B0(R), B1(R), B2(R), primitive C(L) comprising vertices C0(L), C1(L), C2(L) and primitive C(R) comprising vertices C0(R), C1(R), C2(R). Whilst the incoming three primitives referenced only 5 vertices (vertices 0-4), the output primitives, which are all defined independently of each other, reference 18 vertices. In contrast, if the second mode of operation is used to process the same three adjoining primitives A, B, C shown in FIG. 4, six primitives are still output, however, the vertices retain their original indices and hence the topology information is maintained. The output primitives are primitives A(L) and A(R) each comprising vertices 0, 1, 2, primitives B(L) and B(R) each comprising vertices 1, 2, 3, and primitives C(L) and C(R) each comprising vertices 2, 3, 4. However, as the two streams of primitives (labelled L and R streams in this example) reference different vertex sets the output vertices are labelled with (L) or (R) in FIG. 4. It will also be appreciated that whilst the vertices retain their original indices, the vertices themselves may be modified by the geometry shader. In this second mode of operation the incoming three primitives and the output primitives for each stream reference the same number of vertices (5 vertices per stream in the example shown). Consequently the amount of vertex data which is stored in memory is significantly less in the second mode of operation than the first mode of operation (e.g. by using the second mode of operation the bandwidth associated with moving vertex data around a system is reduced to approximately one third of the bandwidth that would be required when using the first mode of operation). Additionally, in the example shown in FIG. 4, only 10 vertices (5 vertices for each stream) are processed in the geometry shader in the second mode of operation, compared to 18 in the first mode of operation.

The second mode of operation can only be used where the geometry shader maintains the primitive connectivity, either because it passes through the topology unchanged (as in the example in FIG. 3) or because it duplicates the topology into two or more parallel primitive streams (as in the example in FIG. 4), although vertices may themselves be modified in a consistent manner. This is determined at compile time (i.e. in a compiler when compiling the geometry shader) and control state data is generated at compile time which sets the mode of operation of the geometry shading stage 126. The geometry shading stage 126 receives the control state data (block 502) and switches between the first and second modes of operation based on the control state data (blocks 504-508) as shown in FIG. 5. If the control state data is not equal to the second value ('No' in block 504), the geometry shading stage 126 is set to the first mode of operation (block 506). If the control state data is equal to the second value ('Yes' in block 504), the geometry shading stage 126 is set to the second mode of operation (block 508).

Figure 6A:
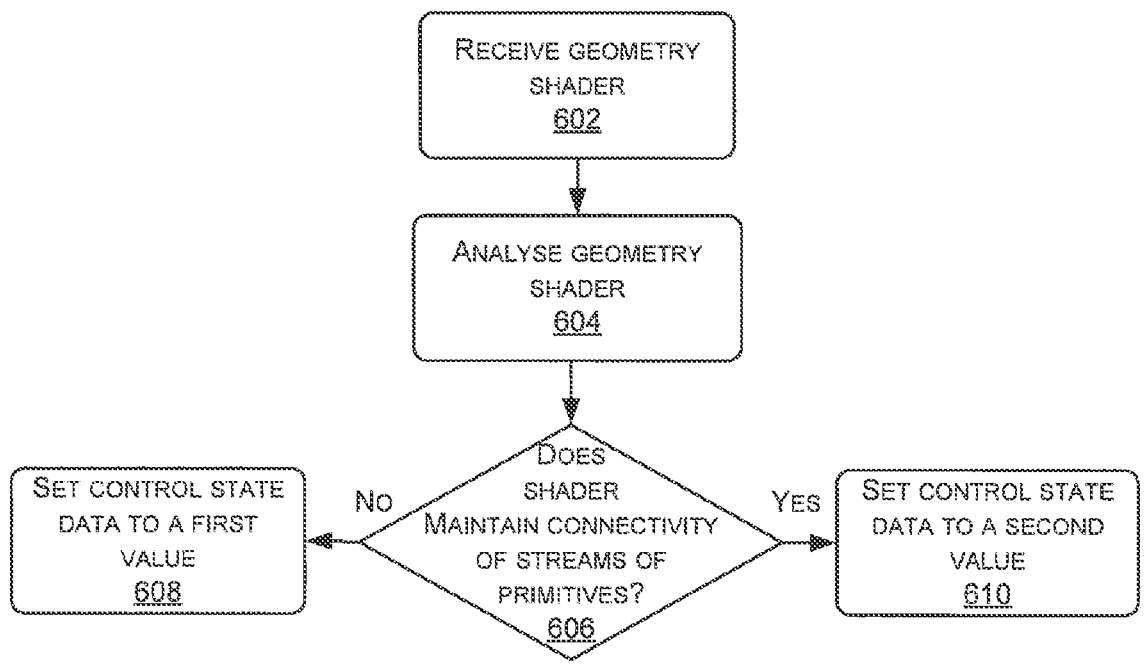
FIG. 6A is a flow diagram of a first example method of operation of a compiler.

The operation of the compiler is shown in FIG. 6A. In block 602, the compiler (which may comprise device executable instructions and which may be stored in memory and executed by a processor) receives the geometry shader (i.e. the program code for the geometry shader) and analyses the geometry shader code (block 604) to determine whether the geometry shader maintains the primitive connectivity of streams of input primitives, e.g. by passing the topology through (as in the example shown in FIG. 3) or by duplicating the topology into parallel streams (as in the example shown in FIG. 4). In response to determining that the geometry shader does not maintain the connectivity of streams of input primitives ('No' in block 606), the control state data is set to a first value (block 608) which causes the geometry shading stage 126 to operate in the first mode of operation (as shown in FIG. 5). In response to determining that the geometry shader does maintain the connectivity of streams of input primitives ('Yes' in block 606), the control state data is set to a second value (block 610) which causes the geometry shading stage 126 to operate in the second mode of operation (as shown in FIG. 5).

In various examples the control state data may be provided as a flag or an extension to the incoming stream of graphics data (e.g. a stereoscopic extension). In other examples the control state data (which may also be referred to as a control flag) may be passed directly to the API hardware Driver by the application by way of a modification or extension to the standard API's (e.g. OpenGL, OpenGL ES, Direct X, Vulcan etc.).

Examples of geometry shaders which preserve topology and hence where the control state data may be set to the second value by the compiler include, but are not limited to:

Stereoscopic rendering,

Rendering to an array of surfaces where each surface has a different transform associated with it (e.g. cube maps), and Information gathering (i.e. where the geometry shader analyses data as it passes through e.g. to calculate an average density of vertices).

Figure 6B:
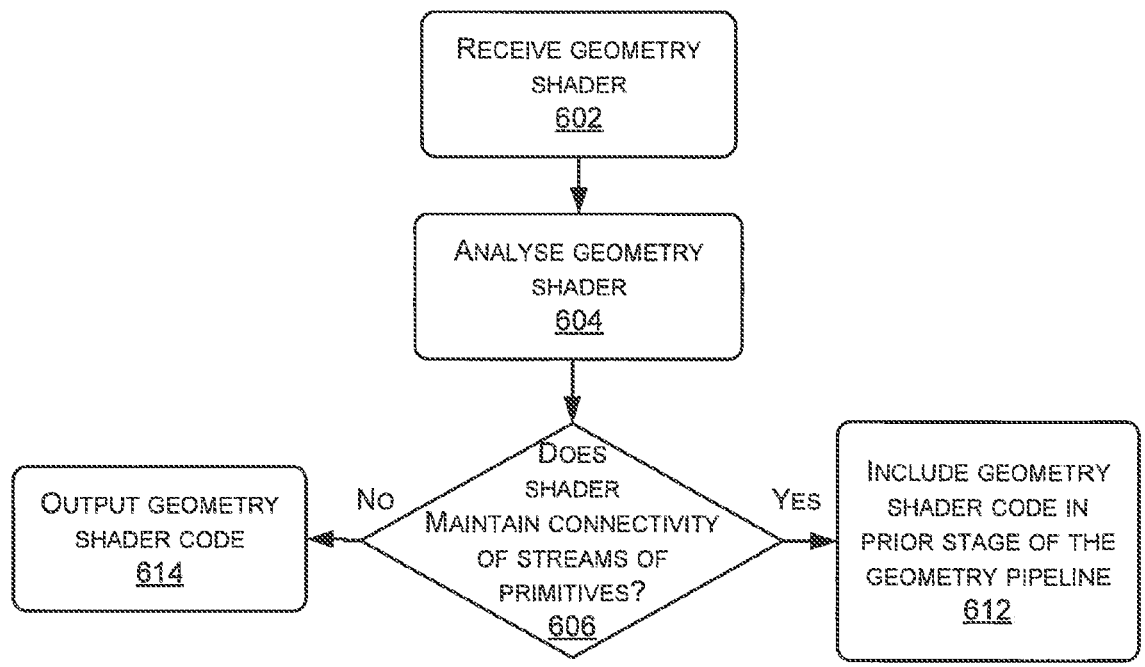
FIG. 6B is a flow diagram of a second example method of operation of a compiler.

In an alternative implementation, the compiler may operate as shown in FIG. 6B. The alternative approach works by spotting geometry shader cases where the input connectivity data can be carried forward to the geometry shader output streams ('Yes' in block 606). In these cases the geometry shader code is collapsed into the prior stage of the geometry pipeline (block 612), for example the vertex shader (as executed in the vertex processing stage 124 which may alternatively be referred to as the vertex shading stage), such that the prior stage (which already takes into account connectivity) directly emits the vertices for each output stream. If, however, the compiler analyses the geometry shader code (in block 604) and determines that the geometry shader does not maintain the connectivity of streams of input primitives ('No' in block 606), then the compiler outputs geometry shader code in the standard way (block 614).

In the example shown in FIG. 1, the tile-based graphics processing system 100 is a deferred rendering system, meaning that the rendering unit 110 performs hidden surface removal on a primitive fragment prior to performing texturing and/or shading on the primitive fragment in order to render the scene. However, in other examples, graphics processing systems might not be deferred rendering systems, such that rendering units may perform texturing and/or shading on a primitive fragment before hidden surface removal is performed on the primitive fragment.

It will be appreciated that some elements of the graphics processing system 100 are not shown in FIG. 1. For example, the graphics processing system 100 may comprise additional shading stages, e.g. a hull shading stage and/or a domain shading stage. In various examples the graphics processing system 100 may additionally comprise a tessellation unit (e.g. which may be located between the vertex processing module 124 and the geometry shading stage 126). In such examples, the indices that are bypassed in the second mode of operation (i.e. when connectivity is preserved) are those indices that are generated as part of the tessellation process and not the original input indices that reference the patch data (and not the tessellated vertex data).

Using the methods described above, the original indices for the vertices are used all the way through the pre-processing block 106 and into the tiling unit 108 (e.g. instead of being replaced by new indices in the geometry shading stage 126). Whilst the original vertex indices are used, the vertex data to which it refers may be modified and hence the original indices may be used to access modified vertex data. In the tiling unit 108 (e.g. in the processing block 112), the original indices are used to access the modified vertex data which is then formed into the primitive blocks output by the tiling unit 108 and stored in memory 104A.

By using the methods described above, memory bandwidth is reduced for any geometry shader that is topology and connectivity preserving.

Whilst the methods are mainly described above with reference to tile-based rendering, the methods may also be used in graphics processing systems which use IMR. In immediate mode renderers, work that is sent to the GPU is drawn immediately and there is little connection to anything that has been drawn previously or will be drawn in the future. Triangles are sent to the graphics processing system and are shaded, the triangles are then rasterized into pixels and shaded before the rendered pixels are sent to the screen. In examples where the methods described herein are used in IMR-based rendering devices (e.g. in a graphics processing system which uses IMR), the methods lead to a reduction of internal bandwidth for passing vertex data for triangles to the rasterization pipeline.

Figure 7A:
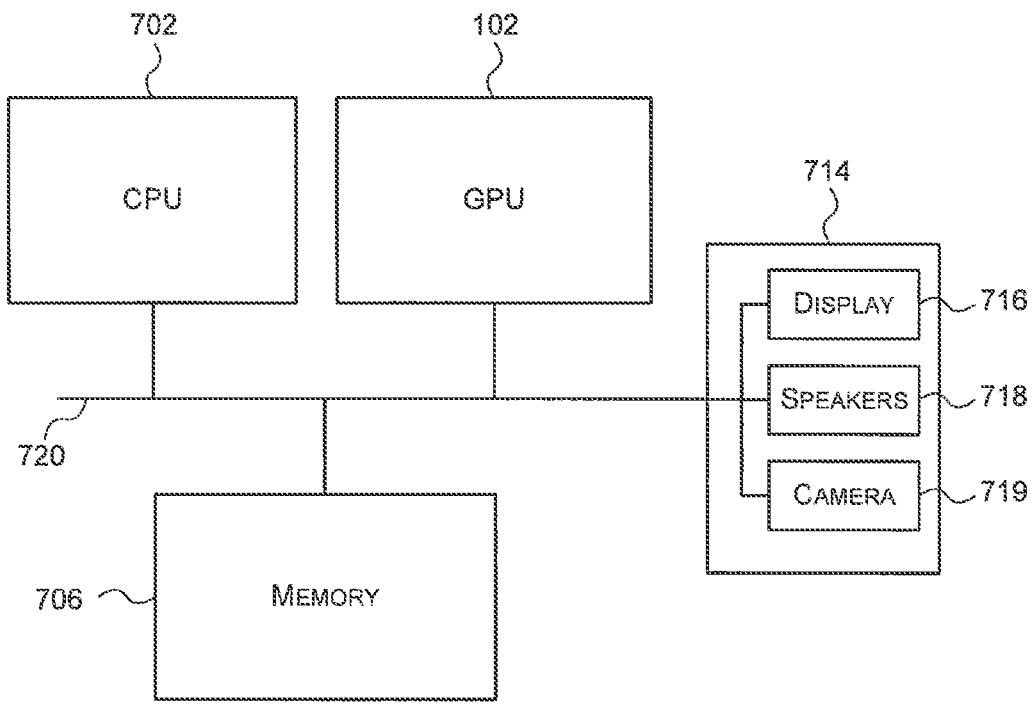
FIG. 7A shows a computer system in which a graphics processing system is implemented.

FIG. 7A shows a computer system in which the graphics processing systems described herein may be implemented. The computer system comprises a GPU 102 (e.g. as shown in FIG. 1 and described above), a CPU 702, a memory 706 and other devices 714, such as a display 716, speakers 718 and a camera 719. The components of the computer system can communicate with each other via a communications bus 720. The memories 104A and 104B shown in FIG. 1 may be implemented as part of memory 706.

Figure 7B:
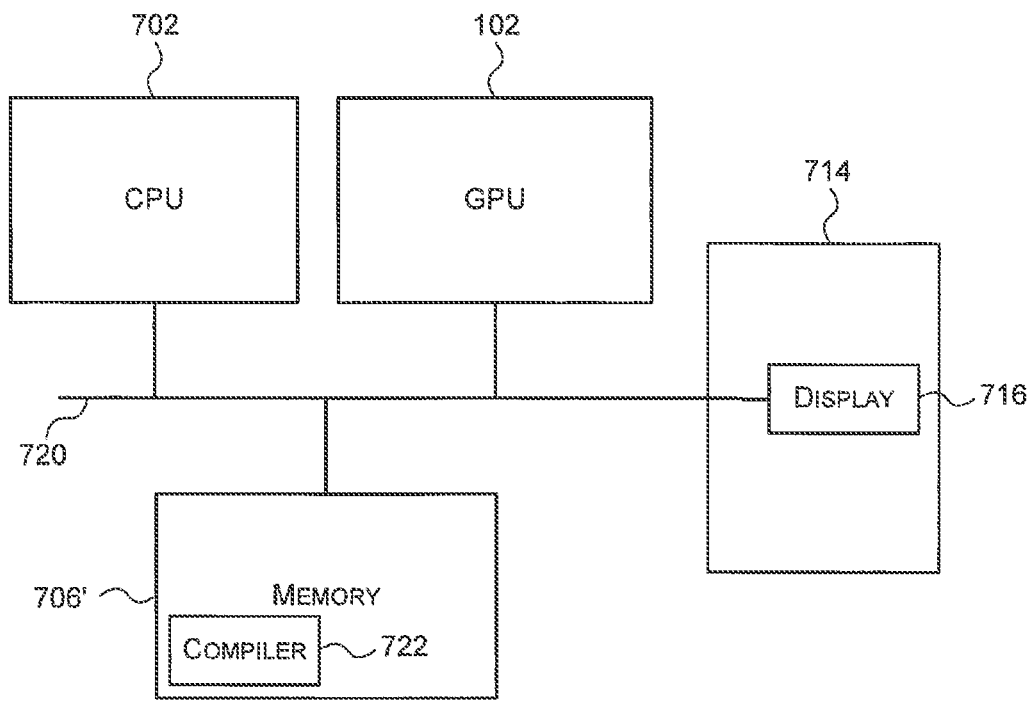
FIG. 7B shows a computer system configured to implement the methods of FIGS. 6A and/or 6B.

FIG. 7B shows a computer system in which the methods shown in FIGS. 6A and 6B and described above may be implemented. The computer system as similar to that shown in FIG. 7A and described above; however the memory 706' is arranged to stored compiler software 722. The compiler software 722 comprises device executable instructions that, when executed by the CPU 702, cause the computer system to implement the method of FIG. 6A or 6B.

The GPU 102 of FIG. 1, and in particular the pre-processing block 106, is shown as comprising a number of functional blocks. This is schematic only and is not intended to define a strict division between different logic elements of such entities. Each functional block may be provided in any suitable manner. It is to be understood that intermediate values described herein as being formed by a GPU need not be physically generated by the GPU at any point and may merely represent logical values which conveniently describe the processing performed by the GPU between its input and output.

The graphics processing system described herein may be embodied in hardware on an integrated circuit. The graphics processing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 8.

Figure 8:
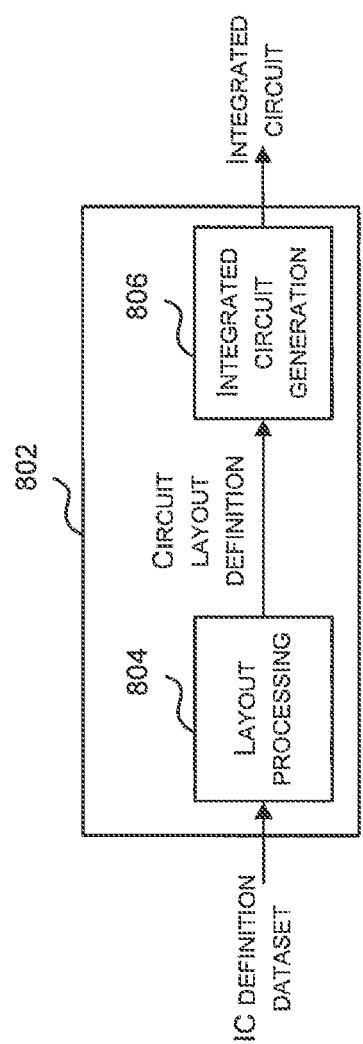
FIG. 8 shows an integrated circuit manufacturing system for generating an integrated circuit embodying a graphics processing system.

FIG. 8 shows an example of an integrated circuit (IC) manufacturing system 802 which is configured to manufacture a graphics processing system as described in any of the examples herein. In particular, the IC manufacturing system 802 comprises a layout processing system 804 and an integrated circuit generation system 806. The IC manufacturing system 802 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 802 to manufacture an integrated circuit embodying a graphics processing system as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of controlling operation of a geometry shading stage in a graphics processing system, the method comprising:
    analyzing a geometry shader to determine whether it preserves connectivity of a topology of primitives input to the geometry shader;
    in response to determining that the geometry shader modifies the topology of primitives input to the geometry shader, generating control state data having a first value;
    in response to determining that the geometry shader does preserve connectivity of the topology of primitives, generating control state data having a second value; and
    wherein the first value of control state data is configured to set the geometry shading stage into a first mode of operation and the second value of control state data is configured to set the geometry shading stage into a second mode of operation.

2. The method according to claim 1, wherein in the first mode of operation each primitive output by the geometry shading stage is independent and in the second mode of operation connectivity of primitives output by the geometry shading stage is maintained.

3. The method according to claim 1, wherein the analysis is implemented in a compiler.

4. The method according to claim 1, further comprising outputting the control state data, wherein the outputting comprises:
    providing the control state data as an extension to a stream of graphics data input to the geometry shading stage; and
    passing the control state data to the geometry shading stage in an API.

5. The method according to claim 1, wherein the method further comprises:
    receiving the control state data; and
    switching the geometry shading stage between the first mode of operation and the second mode of operation dependent upon a value of the received control state data;
    wherein in the first mode of operation each output primitive is independent and in the second mode of operation connectivity of primitives is maintained.

6. The method according to claim 5, further comprising, in the second mode of operation:
    receiving primitive data for a primitive, the primitive data referencing a plurality of vertices;
    identifying those vertices referenced in the primitive data that have not been previously processed by the geometry shading stage;
    processing only the identified vertices; and
    emitting data for the primitive.

7. The method according to claim 6, further comprising, in the second mode of operation:
    storing an output from the processing of the identified vertices in a buffer, wherein the output comprises modified vertex data.

8. The method according to claim 5, further comprising, in the first mode of operation:
    receiving primitive data for a primitive, the primitive data referencing a plurality of vertices;
    processing each of the plurality of vertices; and
    emitting data for the primitive.

9. The method according to claim 5, wherein the control state data relates to a particular geometry shader and is generated when the geometry shader is compiled.

10. The method according to claim 5, further comprising:
    receiving primitive data as a stream of graphics data;
    wherein the control state data is received as an extension to the stream of graphics data.

11. The method according to claim 5, wherein the control state data is received from an application via an API.

12. The method of claim 5, wherein the geometry shading stage is operated in the second mode of operation for stereoscopic rendering.

13. A processor configured to perform the method as set forth in claim 1.

14. The processor of claim 13, wherein the processor is embodied in hardware on an integrated circuit.

15. A method of manufacturing a processor as set forth in claim 14, comprising inputting into an integrated circuit manufacturing system a computer readable dataset description of a processor as set forth in claim 14, which causes the integrated circuit manufacturing system to manufacture said processor.

16. A non-transitory computer readable storage medium having stored thereon computer readable code configured to cause the method of claim 1 to be performed when the code is run.

17. A non-transitory computer readable storage medium having stored thereon a computer readable dataset description of an integrated circuit that, when processed in an integrated circuit manufacturing system, causes the integrated circuit manufacturing system to manufacture a processor configured to perform the method as set forth in claim 1.

18. An integrated circuit manufacturing system configured to manufacture a processor configured to perform the method as set forth in claim 1.

19. An integrated circuit manufacturing system comprising:
    a computer readable storage medium having stored thereon a computer readable dataset description of an integrated circuit that describes a processor configured to perform the method as set forth in claim 1;
    a layout processing system configured to process the integrated circuit description so as to generate a circuit layout description of an integrated circuit embodying the processor; and
    an integrated circuit generation system configured to manufacture the processor according to the circuit layout description.

* * * * *